United States Patent
Votava

(10) Patent No.: US 6,418,141 B1
(45) Date of Patent: Jul. 9, 2002

(54) MULTI-CAST ENABLED WEB SERVER

(75) Inventor: Craig M. Votava, Warrenville, IL (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/088,604

(22) Filed: Jun. 1, 1998

(51) Int. Cl.[7] .......................... H04L 12/28; H04L 12/56
(52) U.S. Cl. ..................... 370/390; 370/432; 709/203; 709/239
(58) Field of Search .................... 370/259, 260, 370/389, 400, 410, 390, 432; 709/208, 217, 219, 227, 228, 229, 239, 203

(56) References Cited

U.S. PATENT DOCUMENTS

| | | | |
|---|---|---|---|
| 5,481,297 A | | 1/1996 | Cash et al. |
| 5,526,024 A | | 6/1996 | Gaglianello et al. |
| 5,623,308 A | | 4/1997 | Civanlar et al. |
| 5,691,768 A | | 11/1997 | Civanlar et al. |
| 5,710,591 A | | 1/1998 | Bruno et al. |
| 5,724,355 A | | 3/1998 | Bruno et al. |
| 5,920,701 A | * | 7/1999 | Miller et al. ................ 709/228 |
| 6,011,782 A | * | 1/2000 | DeSimone et al. ......... 370/260 |
| 6,038,601 A | * | 3/2000 | Lambert et al. ............ 709/226 |
| 6,041,343 A | * | 3/2000 | Nguyen et al. ............. 709/203 |
| 6,181,697 B1 | * | 1/2001 | Nurenberg et al. ......... 370/390 |
| 6,233,618 B1 | * | 5/2001 | Shannon ..................... 709/229 |

OTHER PUBLICATIONS

US 5,715,404, 02/1998, Katseff et al. (withdrawn).

* cited by examiner

*Primary Examiner*—David R. Vincent
*Assistant Examiner*—Bob A. Phunkulh

(57) ABSTRACT

A method for supplying a requested web page to at least one client is disclosed. In normal operation, a server or host computer waits for a client to request a web page. After being requested, the server determines whether the requested web page is a high-volume page. If the requested web page is not a high-volume page, the web page is unicast to the client. If the requested web page is a high-volume page, the server determines whether the requested web page is currently being multi-cast. If the requested web page is currently being multi-cast, the server increments a counter by one. If the requested web page is not currently being multi-cast, the server re-directs the client to a multi-cast address, sets the counter to a numeric value of one and initiates a multi-cast of the requested web page.

5 Claims, 3 Drawing Sheets

MULTI-CAST ENABLED WEB SERVER

MULTI-CAST ENABLED WEB SERVER

FIELD OF THE INVENTION

This invention relates to web servers on the Internet. In particular, this invention pertains to an improved method of transmitting web pages over the Internet from a server to a client.

BACKGROUND OF THE INVENTION

In order to understand the multi-cast enabled web server and browser of the present invention, network data transmission methods and typical web client/server interactions must be understood.

With respect to data transmission methods, most networks that interact with each other on the Internet follow the Internet Protocol Version 4 ("IPv4") standard for transmitting data. Internet Protocol ("IP") is part of the TCP/IP family of protocols describing software that tracks the Internet address of nodes, routes outgoing messages, and recognizes incoming messages. The two most common methods for transmitting data under IPv4 are unicasting and broadcasting.

As used herein, the term "unicasting" is defined as the sending of information across a network or the Internet from one specific computer to another specific computer. Unicasting is the most common method of transmitting information over the Internet. FIG. 1 illustrates the unicasting method of data transmission. As shown in FIG. 1, Host A 100 is unicasting information to the computer labeled Host D 102. All other hosts 104, 106, 108 on the Internet 110 ignore this information.

The problem with using the unicasting method to transmit information across the Internet for high-volume web pages is apparent. For example, if a host computer receives five thousand (5000) requests for the same web page, the host computer must-if using the unicasting method-separately transmit the same web page five thousand (5000) times to each different client. Thus, when used for high-volume web pages, the unicasting method unnecessarily places a heavy load on the host computer.

Another method of data transmission is broadcasting. As used herein, the term "broadcasting" is defined as the sending of information from one specific computer within a network segment or an Internet segment to every other computer in that segment. A "network segment" or an "Internet segment" is a subset of the network that appears on one side of a router. Every one of these receiving computers must process the broadcast message, it cannot be ignored. However, it should be noted that broadcasted messages are not propagated across Internet segments. Thus, in order for the broadcasting method to work, it is a requirement that all involved computers must be on the same network segment. FIG. 2 illustrates the broadcasting method of data transmission. As shown in FIG. 2, if Host A 100 wants to send information to Host D 102 using the broadcasting method, Host A 100 must broadcast information to all computers 102, 104, 106, 108 on the Internet segment 200.

The problems with using the broadcasting method to transmit information across the Internet are also apparent. For example, the broadcasting method is not able to transmit information across multiple Internet segments. In addition, the broadcasting method is very inefficient if only a small number of clients have requested the same information, because each computer that receives the broadcast message must process the message and cannot ignore it. Thus, the broadcasting method unnecessarily shifts the burden from the host computer to each individual client within a given Internet segment.

Accordingly, it is an object of the present invention to provide an improved method of supplying information over a network that minimizes the loads placed on the host computer as well as on each client, and also minimizes the amount of network bandwidth required to transmit the information to the requesting clients.

SUMMARY OF THE INVENTION

The method of the present invention supplies a requested web page to at least one client. In normal operation, a server or host computer waits for a client to request a web page. After being requested, the server determines whether the requested web page should be multi-cast or unicast. If the server determines that the requested web page should be unicast, the web page is unicast to the client. If the server determines that the requested web page should be multi-cast, the server next determines whether the requested web page is currently being multi-cast. If the requested web page is currently being multi-cast, the server re-directs the client to a multi-cast address and then increments a counter by one. If the requested web page is not currently being multi-cast, the server re-directs the client to a multi-cast address, sets the counter to a numeric value of one and initiates a multi-cast of the requested web page.

BRIEF DESCRIPTION OF THE DRAWINGS

The invention may take physical form in certain parts and steps, preferred embodiments of which will be described in detail in this specification and illustrated in the accompanying drawings which form a part hereof, wherein.

DETAILED DESCRIPTION OF THE PREFERRED EMBODIMENTS

Figure 1:
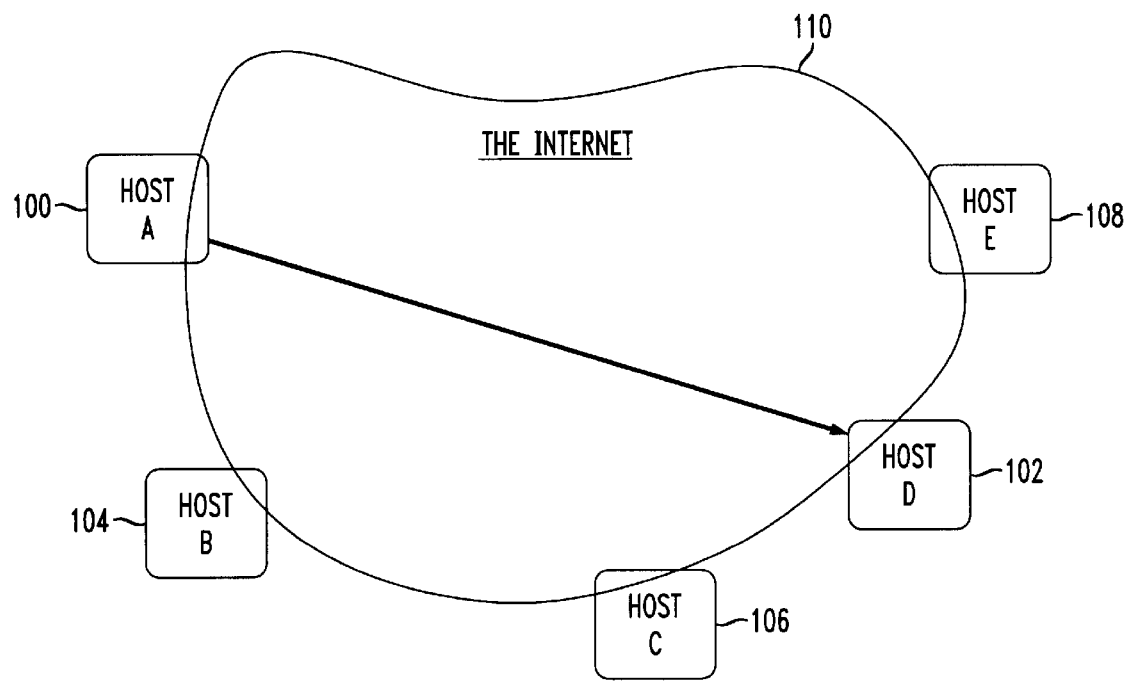
FIG. 1 shows a schematic, idealistic illustration of the unicasting method of point to point data transmission over the Internet.
Figure 2:
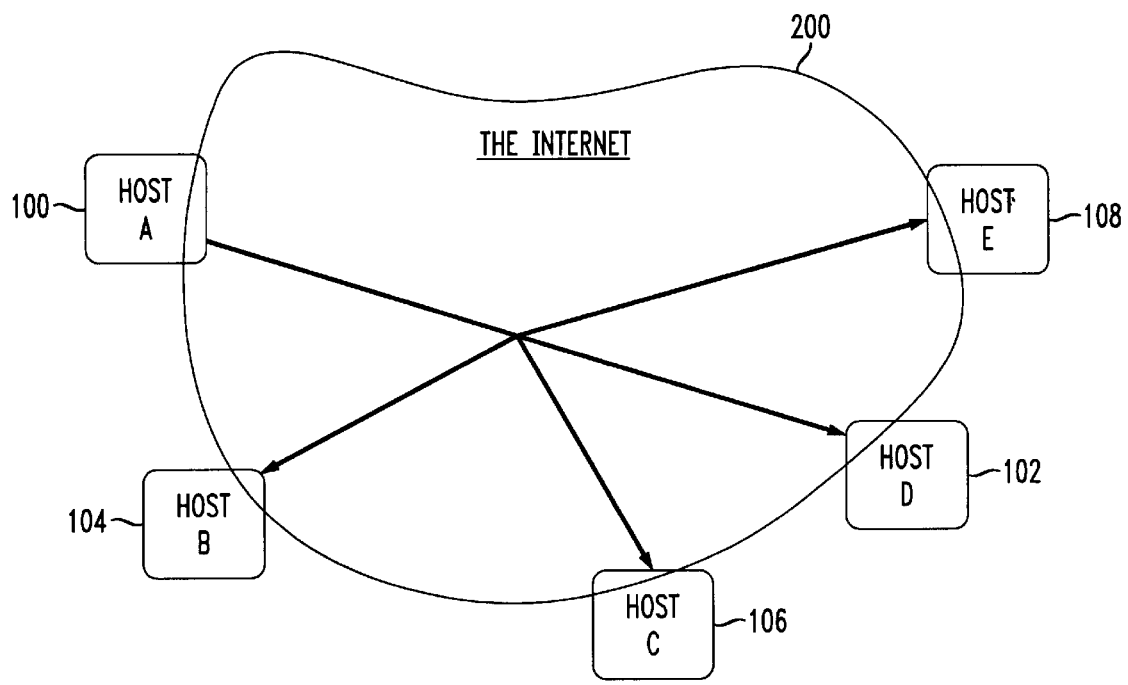
FIG. 2 shows a schematic, idealistic illustration of the broadcasting method of data transmission on an Internet segment.
Figure 3:
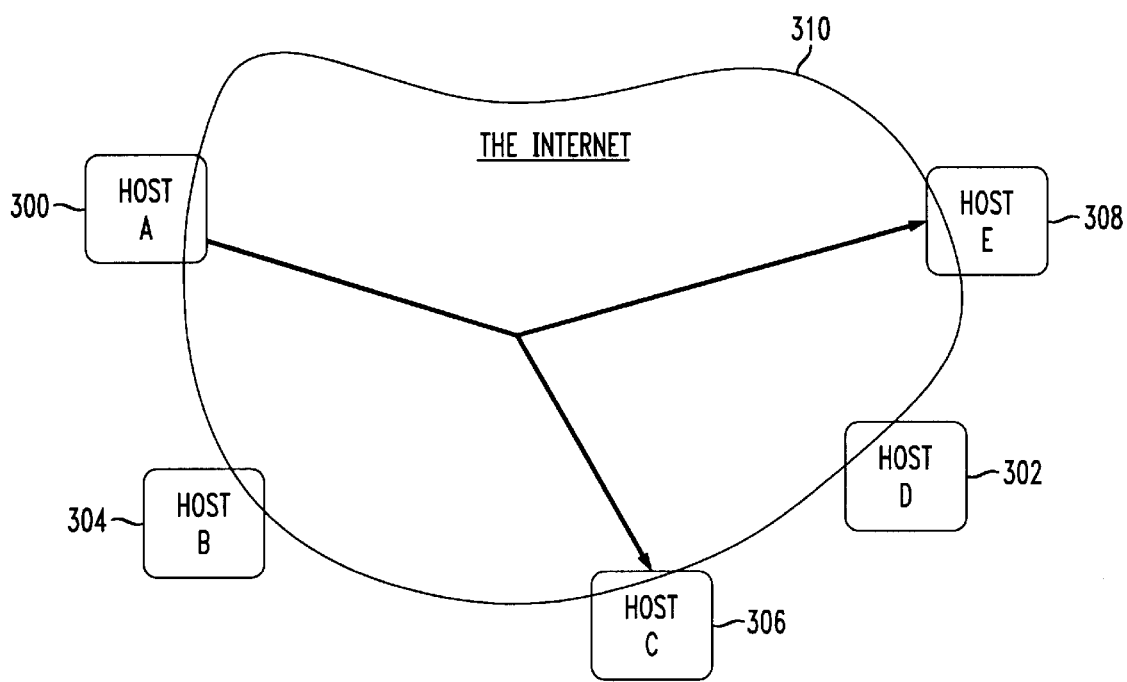
FIG. 3 shows a schematic, idealistic illustration of the multi-casting method of data transmission over the Internet.

With reference now to the figures and in particular with reference to FIG. 3, a multi-cast enabled web server 300 of the present invention is depicted. The web server 300 is selectively transmitting information to other host computers 306, 308 over the Internet 310 via a multi-casting method of data transmission. As used herein, "multi-casting" is generally defined as the ability of one computer to send identical information to any number of other computers. This method of data transmission allows a single specific computer to send out a data stream to zero-or-more other computers on the Internet. Unlike broadcasting, the computers receiving the multi-cast information can choose to either listen to a particular data stream, or ignore it. In addition, unlike broadcasting, the multi-casting method works across Internet segment boundaries. FIG. 3 illustrates the multi-casting method of data transmission. As shown in FIG. 3, Host A 300 is multi-casting information to Hosts C and E 306, 308, and Hosts B and D 304, 302 are able to ignore the data stream.

Figure 4:
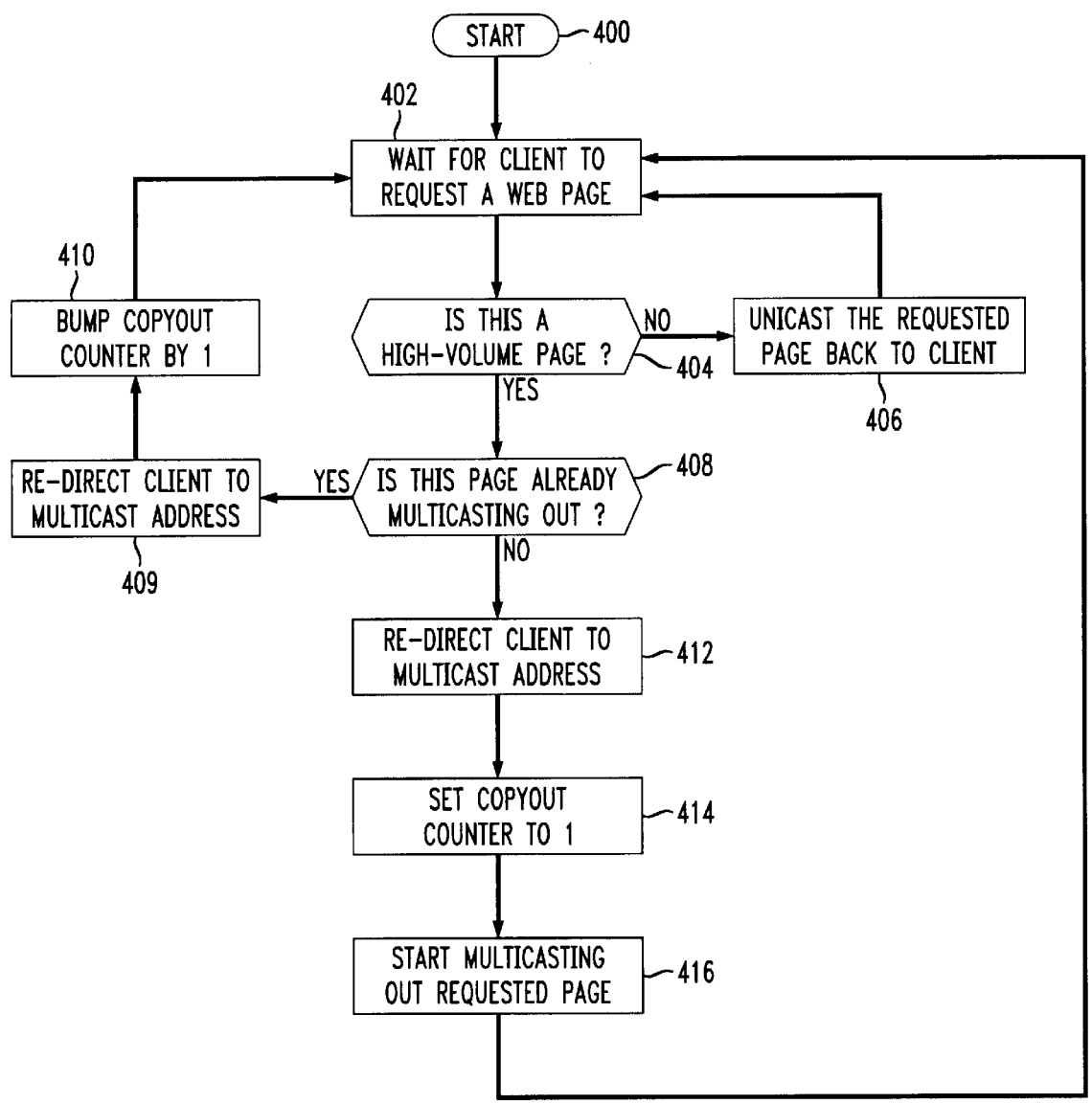
FIG. 4 shows a flow chart illustrating the software steps performed in the multi-cast enabled web server method of the present invention.

A flow chart illustrating the software steps performed in the multi-cast enabled web server method of the present invention is depicted in FIG. 4. After the method or software routine is started 400, the multi-cast enabled web server 100 waits for a client to request a web page 402. After a client requests a web page, the server 100 or some other computer determines whether the requested page should be unicast or multi-cast. Any criteria could be used to make this determination. However, in the preferred embodiment, the criteria used to select between unicasting and multi-casting is whether the requested web page is a high-volume page. A "high-volume" web page as used herein simply refers to how often the web page is requested. If the web page is requested often, the page is considered to be a "high-volume" page. Thus, in the preferred embodiment, after a client requests a web page, the server 100 or some other computer determines whether the requested web page is a high-volume page 404.

If the web page is not a high-volume web page, the server 100 unicasts the requested page back to the client 406. In other words, the server 100 unicasts web pages to clients when it is more efficient to do so, and the classification of a page as being "high-volume" or not is the threshold used by the computer to determine whether it is more efficient to unicast a web page or multi-cast the page to a client. After unicasting the low volume (i.e. not high-volume) requested page to the client 406, the server 100 continues to wait for a client to request the same or another web page 402.

If the requested web page was a high-volume page, the server 300 determines whether the page is already being multi-cast out 408 to other clients 306, 308. If the page is currently being multi-cast, the server 300 re-directs the client to a multi-cast address 409 where the client can receive the requested web page. The server 300 then increments or otherwise adjusts a counter monitoring the multi-cast process 410. The counter simply controls the number of times and/or how long the server 300 multi-casts the requested web page. After incrementing the counter, the server 100 continues to wait for a client to request the same or another web page 402.

If the requested page was not currently being multi-cast out, the server 300 re-directs the client to a multi-cast address 412 where the client can receive the requested web page. The multi-cast address is merely an electronic address from which the client can receive a data stream, such as an IP address, and is located on the server 300 or on any other computer. The server 300 then proceeds to initialize the above-referenced counter and set the counter to the numeric value of one 414. The server 300 then starts to multi-cast the requested page to the client 416. After initiating the multi-cast, the server 100 continues to wait for a client to request the same or another web page 402.

Thus, the method of the present invention conserves a web servers' processing power and network bandwidth by allowing the server to multi-cast out a single copy of a web page to all requesting clients, instead of requiring the web server to unicast out a separate copy of the web page to each individual requesting client. Simply put, if five thousand (5000) clients simultaneously request the same web page from a server, a multi-cast enabled web server only has to multi-cast out one copy of the web page, whereas prior art servers must unicast out the requested page five thousand (5000) times, once to each requesting client.

It should be noted that the present invention could easily be used in many different contexts. For example, TCP/IP protocols and client/server networks are well known in the art. Transmission Control Protocol/Internet Protocol ("TCP/IP") is a networking protocol that provides communication across interconnected networks, between computers with diverse hardware architectures and various operating systems. In a client/server network, clients are devices and software that request information or applications from servers. Servers are shared computers on a network Thus, the method of the present invention could be used to transmit any type of data or other information on any client/server network using any protocol, such as TCP/IP.

SCOPE

The present invention has been described in the foregoing specification with reference to specific exemplary embodiments thereof. It will be apparent to those skilled in the art, that a person understanding this invention may conceive of changes or other embodiments or variations, which utilize the principles of this invention without departing from the broader spirit and scope of the invention as set forth in the appended claims. All are considered within the sphere, spirit, and scope of the invention. The specification and drawings are, therefore, to be regarded in an illustrative rather than restrictive sense. Accordingly, it is not intended that the invention be limited except as may be necessary in view of the appended claims.

What is claimed is:

1. A method of supplying requested information to at least one client, said method comprising the steps of:
   a. determining whether the requested information is currently being multi-cast;
   b. re-directing said at least one client to a multi-cast address; and
   c. if the requested information is not currently being multi-cast, initiating multi-cast of said requested information.

2. The method of claim 1 wherein said information is a web page.

3. A method of supplying a requested web page to at least one client, said method comprising the steps of:
   a. waiting for said at least one client to request said requested web page;
   b. determining whether the requested web page is currently being multi-cast;
   c. re-directing said at least one client to a multi-cast address;
   d. if the requested web page is currently being multi-cast, adjusting a counter;
   e. if the requested web page is not currently being multi-cast, setting the counter to a specific numeric value; and
   f. initiating multi-cast of said requested web page.

4. The method of claim 3 further comprising the steps of:
   a. determining whether the requested web page is a high-volume page; and
   b. if the requested web page is not a high-volume page, unicasting the requested web page to said at least one client.

5. A method of supplying a requested web page to at least one client, said method comprising the steps of:
   a. waiting for said at least one client to request said requested web page;
   b. determining whether the requested web page is a high-volume page;
   c. if the requested web page is not a high-volume page, unicasting the requested web page to said at least one client;

d. if the requested web page is a high-volume page, determining whether the requested web page is currently being multi-cast;

e. re-directing said at least one client to a multi-cast address;

f. if the requested web page is currently being multi-cast, incrementing a counter by one;

g. if the requested web page is not currently being multi-cast, setting the counter to a numeric value of one; and h. initiating multi-cast of said requested web page.

\* \* \* \* \*